(12) United States Patent  (10) Patent No.: US 8,451,585 B2
Quinliven  (45) Date of Patent: May 28, 2013

(54) ELECTRIC DOUBLE LAYER CAPACITOR AND METHOD OF MAKING

(75) Inventor: Peter Quinliven, Ukiah, CA (US)

(73) Assignee: Peter M. Quinliven, Ukiah, CA (US)

( * ) Notice: Subject to any disclaimer, the term of this patent is extended or adjusted under 35 U.S.C. 154(b) by 408 days.

(21) Appl. No.: 12/762,333

(22) Filed: Apr. 17, 2010

(65) Prior Publication Data

US 2011/0255213 A1  Oct. 20, 2011

(51) Int. Cl.
*H01G 9/00* (2006.01)
*H01G 9/155* (2006.01)

(52) U.S. Cl.
USPC .......................................... 361/502; 361/503

(58) Field of Classification Search
USPC .................................. 361/502–503
See application file for complete search history.

(56) References Cited

U.S. PATENT DOCUMENTS

| | | | |
|---|---|---|---|
| 2,800,616 A | 7/1957 | Becker | |
| 3,288,641 A | 11/1966 | Rightmire | |
| 3,536,963 A | 10/1970 | Boos | |
| 4,622,611 A | 11/1986 | Bennett | |
| 5,093,762 A * | 3/1992 | Sato et al. | 361/502 |
| 5,150,283 A | 9/1992 | Yoshida | |
| 5,907,472 A | 5/1999 | Farahmandi | |
| 6,522,523 B2 * | 2/2003 | Takatomi et al. | 361/502 |
| 6,843,810 B2 * | 1/2005 | Nakazawa et al. | 29/25.03 |
| 2002/0051335 A1 * | 5/2002 | Ohya et al. | 361/502 |
| 2004/0047798 A1 * | 3/2004 | Oh et al. | 423/414 |
| 2010/0188800 A1 * | 7/2010 | Ashizaki et al. | 361/502 |

* cited by examiner

*Primary Examiner* — Eric Thomas
(74) *Attorney, Agent, or Firm* — Ariel Bentolila

(57) ABSTRACT

An electric double layer capacitor includes a container including electric insulating material for housing the capacitor. At least two electrodes including granular particulate store a charge. An aqueous electrolyte, having a generally neutral pH, floods the at least two electrodes. A separator material including a porous electrical insulating and ionic conducting material separates the at least two electrodes. At least two collectors including graphite each in contact with an electrode conduct current. An elastic compression material compressing the at least two electrodes flooded by the aqueous electrolyte maintains a firm contact of the at least two collectors with material in flooded electrodes. End caps including a high conductivity material joined to the at least two collectors make external electrical connections.

11 Claims, 4 Drawing Sheets

ELECTRIC DOUBLE LAYER CAPACITOR AND METHOD OF MAKING

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

The present invention relates generally to capacitors. More particularly, the invention relates to an inexpensive, non-toxic electric double layer capacitor.

BACKGROUND OF THE INVENTION

Electric double layer capacitors (EDL capacitors) exhibit a very large capacitance as compared to traditional capacitors. This characteristic is useful for many applications that require both high pulse power and relatively large energy storage, coupled together with a high cycle life. Batteries have been traditionally applied for such applications yet have fallen short in terms of pulse power delivery and cycle life. As a result of these superior qualities, EDL capacitors have mainly been developed specifically for applications that demand a high power density and cycle life. For applications where the primary concern is energy density, batteries have continued to dominate.

EDL capacitors store energy by charge separation in much the same manner as traditional capacitors. Traditional capacitors have two conductors that are separated by a dielectric material. When charged, the capacitor builds up a static charge on the surface of the conductors. In an EDL capacitor, the charge is also stored on two conductors. In this case, the conductors are made of a high surface area material such as activated carbon and the charge is stored throughout the volume of the electrodes. This provides an extremely large surface area onto which the charges can reside. The difference is that a secondary charge separation occurs within an electrolyte that fills the EDL capacitor. The ions that make up the electrolyte separate and migrate towards the microporous structure of the carbon electrode. The solvent molecules become the dielectric material and result in a charge separation on the order of nanometers. The combination of the large surface area and the microscopic charge separation are what gives the EDL capacitor its large capacitance.

There have been a number of technical developments leading to the prior art EDL capacitors commercially available today. The developments have ranged from the first devices with only a few farads capacitance to a few thousand today. The most common feature of today's EDL capacitors is the use of organic electrolytes with either activated carbon cloth wound in the shape of a cylinder or activated carbon powder processed into pellets. Organic electrolyte is used to avoid corrosion problems with the metal current collectors. In one approach, activated carbon cloth is used as a substrate onto which the metal collector can be conveniently applied. In another approach, activated carbon pellets are formed using finely ground carbon powder with a binding agent, usually Teflon. However, the limitations of these two approaches include the use of toxic and expensive electrolytes and expensive carbon electrode material for the carbon cloth type or limited capacitance for the pelletized type. Also, organic electrolytes have a peak performance when charged between 2.5 to 3 volts, as compared to 1.2 to 1.5 volts for most batteries. This makes it inconvenient to use such ultracapacitors as direct replacements for common batteries. Additional limitations of using organic electrolytes include their inherent high resistance and rendering the carbon electrode material with a low specific capacitance. The resistance of organic electrolytes can be more than 10 times greater than for aqueous electrolytes. The specific capacitance of most activated carbon materials is about half the value when using organic electrolytes as compared with using aqueous electrolytes. These limitations have prevented the widespread commercialization of capacitors in markets dominated by batteries.

The electrodes of EDL capacitors are most often made of activated carbon and utilize solid porous carbon electrodes. However, solid electrodes are brittle and prone to cracking and breaking Some currently known capacitors use pelletized carbon paste electrodes made of finely divided activated carbon to address the brittleness issue. This development allows a more simple method of manufacture. Pelletized carbon paste electrodes, however, exhibit a high rate of self-discharge, high internal resistance due to limited ion mobility within the electrodes, and limited specific capacitance due to the low concentration of electrolyte present. Some prior art capacitors using pelletized carbon paste electrodes use an electrolyte with a pH above 3.5 to reduce the rate of self-discharge. However, no optimum pH has been given. Also, in both low and high pH solutions, the rate of self-discharge for EDL capacitors is still high.

Another problem encountered with prior art EDL capacitors is the problem of corrosion posed by the use of an inorganic salt. The use of a conductive rubber material for the collector successfully addresses the problem of corrosion but at the cost of a high internal resistance. The problem of high internal resistance inherent with activated carbon material has been addressed by some capacitors in the prior art. The use of highly conductive additives mixed with carbon powder or impregnated with carbon fiber material reduces the internal resistance of EDL capacitors. For the case of using metals such as aluminum as an additive, as in some currently known capacitors, only organic electrolytes can be used. When powdered graphite or carbon black is used, as in other currently known capacitors, again, only organic electrolytes can be used. The procedure of adding highly conductive additives reduces the inter-particle resistance, yet still necessitates the use of relatively thin electrodes when carbon powder is utilized.

In view of the foregoing, there is a need for improved techniques for providing EDL capacitors that use inexpensive, non-toxic materials and address the issues of high self-discharge, corrosion and high internal resistance.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1A is a cross sectional view, and FIG. 1B is an exploded view;

FIG. 2A is a cross sectional view, and FIG. 2B is an exploded view;

FIG. 3A is a cross sectional view, and FIG. 3B is an exploded view; FIG. 4A is a cross sectional view, and FIG. 4B is an exploded view.

Figure 1A:
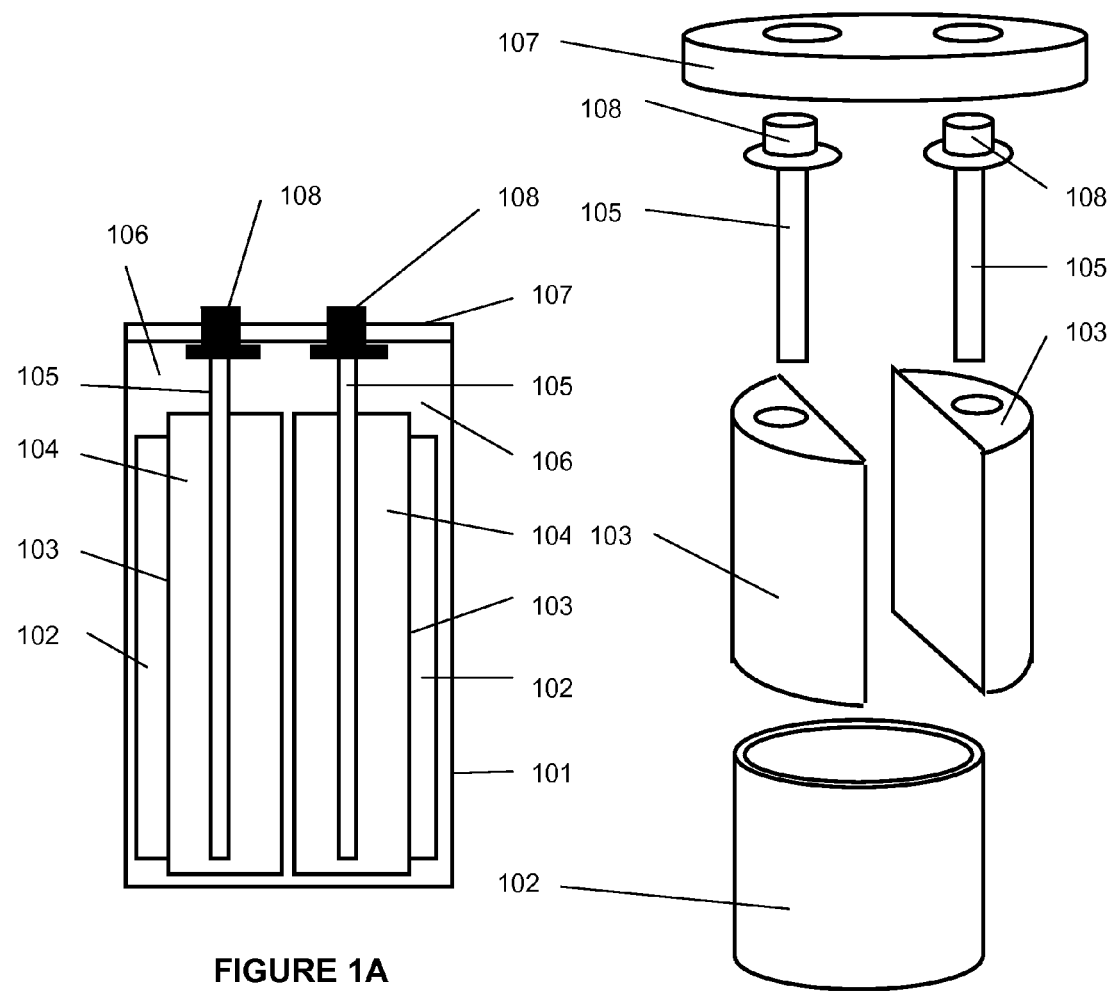
FIGS. 1A and 1B illustrate an exemplary aqueous EDL capacitor having anode and cathode electrical connections terminating at the same end, in accordance with an embodiment of the present invention.

Unless otherwise indicated illustrations in the figures are not necessarily drawn to scale.

SUMMARY OF THE INVENTION

To achieve the forgoing and other objects and in accordance with the purpose of the invention, an electric double layer capacitor and method of making is presented.

In one embodiment an electric double layer capacitor includes means for housing the capacitor, means for storing a charge, means for flooding the storing means with a generally neutral pH, means for separating the at least two electrodes, means for conducting current, means for maintaining a firm contact of the conducting means with material in flooded storing means and means for making external electrical connections.

In another embodiment an electric double layer capacitor includes a container including electric insulating material for housing the capacitor. At least two electrodes including granular particulate store a charge. An aqueous electrolyte having a generally neutral pH floods the at least two electrodes. A separator material including a porous electrical insulating and ionic conducting material separates the at least two electrodes. At least two collectors including graphite each in contact with an electrode conduct current. An elastic compression material compressing the at least two electrodes flooded by the aqueous electrolyte maintains a firm contact of the at least two collectors with material in flooded electrodes. End caps including a high conductivity material joined to the at least two collectors make external electrical connections. In another embodiment the granular particulate includes activated carbon material. In yet another embodiment particles of the activated carbon material are of sufficient size to enable low inter-particle resistance, low restrictive path for ion migration. In still another embodiment the activated carbon material is produced from coconut. In another embodiment the aqueous electrolyte is a saturated solution of a soluble salt. In yet another embodiment the soluble salt includes a chloride salt. In still another embodiment the at least two electrodes form a cylinder shape. In another embodiment the elastic compression material is formed as a band surrounding the cylinder shape. In yet another embodiment each of the at least two electrodes has a semicircular shape and the at least two electrodes are positioned to form the cylinder shape. In still another embodiment the end caps are located on a top end of the container. In another embodiment the at least two electrodes are positioned along a common axis, one of the end caps is located on a top end of the container and another of the end caps is located on a bottom end of the container. In yet another embodiment the elastic compression material is formed as a compression washer adjacent to the end cap on the top. In still another embodiment the compression material is formed as an additional compression washer adjacent to the end cap on the bottom. In another embodiment the at least two electrodes are concentrically arranged and the at least two collectors are concentrically arranged.

In another embodiment a method of making an electric double layer capacitor includes fabricating a container from an electric insulating material for housing the capacitor. An amount of granular particulate is prepared for at least two electrodes for storing a charge. An amount of aqueous electrolyte is prepared having a generally neutral pH. At least two collectors are prepared having graphite for conducting current. The granular particulate is separated into at least two electrodes with a separator material including a porous electrical insulating and ionic conducting material. A collector is positioned in contact with each electrode. Each electrode is flooded with the aqueous electrolyte. The at least two electrodes are compressed with an elastic compression material for maintaining a firm contact of the at least two collectors with material in the flooded electrodes. End caps including a high conductivity material are joined to the at least two collectors for making external electrical connections. In another embodiment the granular particulate includes activated carbon material. In yet another embodiment the activated carbon material is produced from coconut. In still another embodiment the aqueous electrolyte is a saturated solution of a soluble salt. In another embodiment the soluble salt includes a chloride salt.

Other features, advantages, and objects of the present invention will become more apparent and be more readily understood from the following detailed description, which should be read in conjunction with the accompanying drawings.

DETAILED DESCRIPTION OF THE PREFERRED EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The present invention will now be described in detail with reference to embodiments thereof as illustrated in the accompanying drawings.

Detailed descriptions of the preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

It is to be understood that any exact measurements/dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

Preferred embodiments of the present invention provide an alternative for primary and secondary batteries with a high energy density EDL capacitor. An advantage of preferred embodiments is the exclusive use of inert materials for use in applications where toxicity is a concern. Such applications include, but are not limited to, toys for small children, corrosive environments, etc. Furthermore, recent awareness of the effects of toxic chemicals present in the environment has generated a need for new "green" technologies, such as preferred embodiments of the present invention. Another advantage that results from the use of inert ingredients in preferred embodiments is the cost benefit that can be realized from reduced waste management problems. Commercial batteries require special handling and disposal due to their toxic nature. Preferred embodiments are not presently subject to such stringent regulations as the result of the exclusive use of chemically inert materials. Additionally, the working voltage of preferred embodiments of the present invention is 1.3 volts, which is within the same working voltage range for most common batteries. This allows for a direct substitution in most applications involving the use of batteries. A further advantage can be realized with the simple and low cost construction of preferred embodiments of the present invention, which can be manufactured with low cost and readily available materials and with simple manufacturing processes.

Figure 1B:
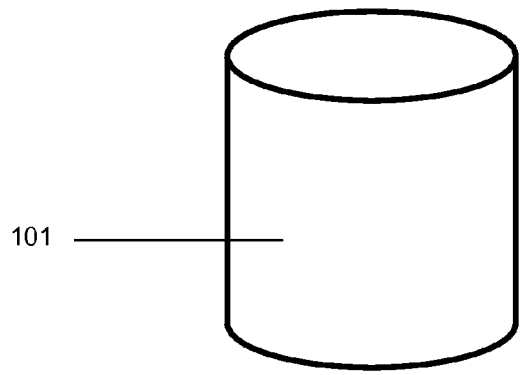

FIGS. 1A and 1B illustrate an exemplary aqueous EDL capacitor having anode and cathode electrical connections terminating at the same end, in accordance with an embodiment of the present invention. FIG. 1A is a cross sectional view, and FIG. 1B is an exploded view. In the present embodiment, the EDL capacitor comprises two electrolyte flooded electrodes 104, one forming the anode and the other one forming the cathode. Each electrode 104 is encapsulated by a separator 103, which is structurally supported and reinforced by a compression band 102. Collectors 105 are kept in firm contact with the surrounding material in flooded electrodes 104 by means of compression band 102. This design allows ions to migrate easily through separators 103 from one electrode 104 to the other at the center where they face each other. The two semicircular electrodes 104 form the natural circular shape that results from the radial force that is applied by compression band 102. With this unique shape, no added weight from reinforcement is required. Collectors 105 penetrate a sealant space 106 and terminate outside a container lid 107 to form an electrical connection with end caps 108. End caps 108 form the external electrical connection point for the EDL capacitor. A container 101, together with sealant space 106, provides an electrolyte tight seal.

In the present embodiment, container 101 forms the casing into which the components of the EDL capacitor are housed. It is preferably made of an electrically insulating and nonporous material that is impervious to the electrolyte and exhibits good structural strength to protect the contents from damage that might be caused by either impact or puncture. Preferred materials include, without limitation, any of the many varieties of plastics that possess such qualities. Container 101 is preferably made to fit snugly over electrodes 104 to minimize weight and maximize energy density. In the present embodiment, container lid 107 is preferably made of the same or similar material as container 101. Container lid 107 provides an enclosure for sealant space 106 and may be securely fastened to container 101 by various means including, but not limited to, a chemical or welded bond, adhesives, or mechanical means. Referring to FIG. 1B, end caps 108 of the anode and cathode protrude from container lid 107 through holes in container lid 107 to provide a means of electrical connection to the EDL capacitor. In some embodiments, to help avoid breakage of the collectors if a pressure is applied to the end caps the end caps can be made of a metallic material and protect the graphite electrodes. Any pressure applied laterally will be transmitted and disbursed through the metal end caps and to the container lid. A vertical force will be transmitted to the sealant, which acts as both a support and a shock absorber by virtue of the material that is used, generally a flexible but strong adhesive material.

In a non-limiting example, an EDL capacitor made in accordance with the present embodiment comprises a plastic container 101 with inside dimensions of 1 inch in diameter and 2 inches in height. Collectors 105 are made from round graphite rods ¼-inch in diameter and 2.25 inches long. The material of electrodes 104 is coconut based activated carbon with a surface area of 1150 $m^2/g$ as determined by the Brunauer-Emmet-Teller (BET) method and a specific capacitance of approximately 75 F/g mixed with 5% powdered graphite. Separators 103 are each fashioned from a strip of 24 lb printer paper 2.125 inches wide and 11 inches long. The paper strips are rolled onto a form with a semicircular cross section to form tubes, such that both tubes fit loosely into plastic container 101. One end of each separator 103 is then closed off by inserting a cardboard end piece and folding over 3/16 inch of the paper tube and affixing with adhesive. Collectors 105 are then inserted into the open-ended tubes of separators 103, which are then each filled with 5 grams of the activated carbon material. Another cardboard end piece is then affixed to the open ends of separators 103 in the same manner previously described, leaving collectors 105 protruding from the assembly of electrodes 104. A rubber strand with a cross section of 1/16 inch by 1/16 inch is wound around the two formed electrodes 104 with an elongation of 250% to provide the necessary compression of compression band 102. A long enough rubber strand is used for compression band 102 to cover the outer circumference of electrodes 104 with one layer. The complete assembly is then inserted into plastic container 101 and flooded with saturated sodium chloride solution. Asphalt is then carefully poured over the top of the assembly to form sealant space 106 between container 101 and collectors 105. Holes are then made in container lid 107 to match the separation of collectors 105, and lid 107 is affixed to container 101 to complete the EDL capacitor assembly. When the completed EDL capacitor is charged to 1.3 volts, the following characteristics are observed after a four-hour charge: a capacitor voltage of 1.28 V, a capacitance of 370 Farads, a maximum current of 2.7 Amperes, and a leakage current of 100 µA @ 1.3 volts. As an example of the discharge rate, pulse power delivery and cycle life achieved by this design as compared to a commercial battery, one embodiment of the present design could be similar in size to the common "C" cell and have demonstrated a discharge of 80% of the stored energy in 5 minutes at maximum current. Experimental results show that a repetitive charge/discharge cycles at 80% depth of discharge at maximum current for 250 cycles can be achieved with no significant loss of performance. This is consistent with the 100,000 cycles common for EDL capacitors. Under such conditions, a common rechargeable battery will typically fail in less than 100 cycles. The peak power of this example is similar to commercially available rechargeable batteries. Of course, the present embodiment can be connected in series with other capacitors of similar capacitance for a higher working voltage. If a larger capacitance is desired, the present invention can be connected in parallel with other EDL capacitors, generally regardless of size.

Figures 2A, 2B:
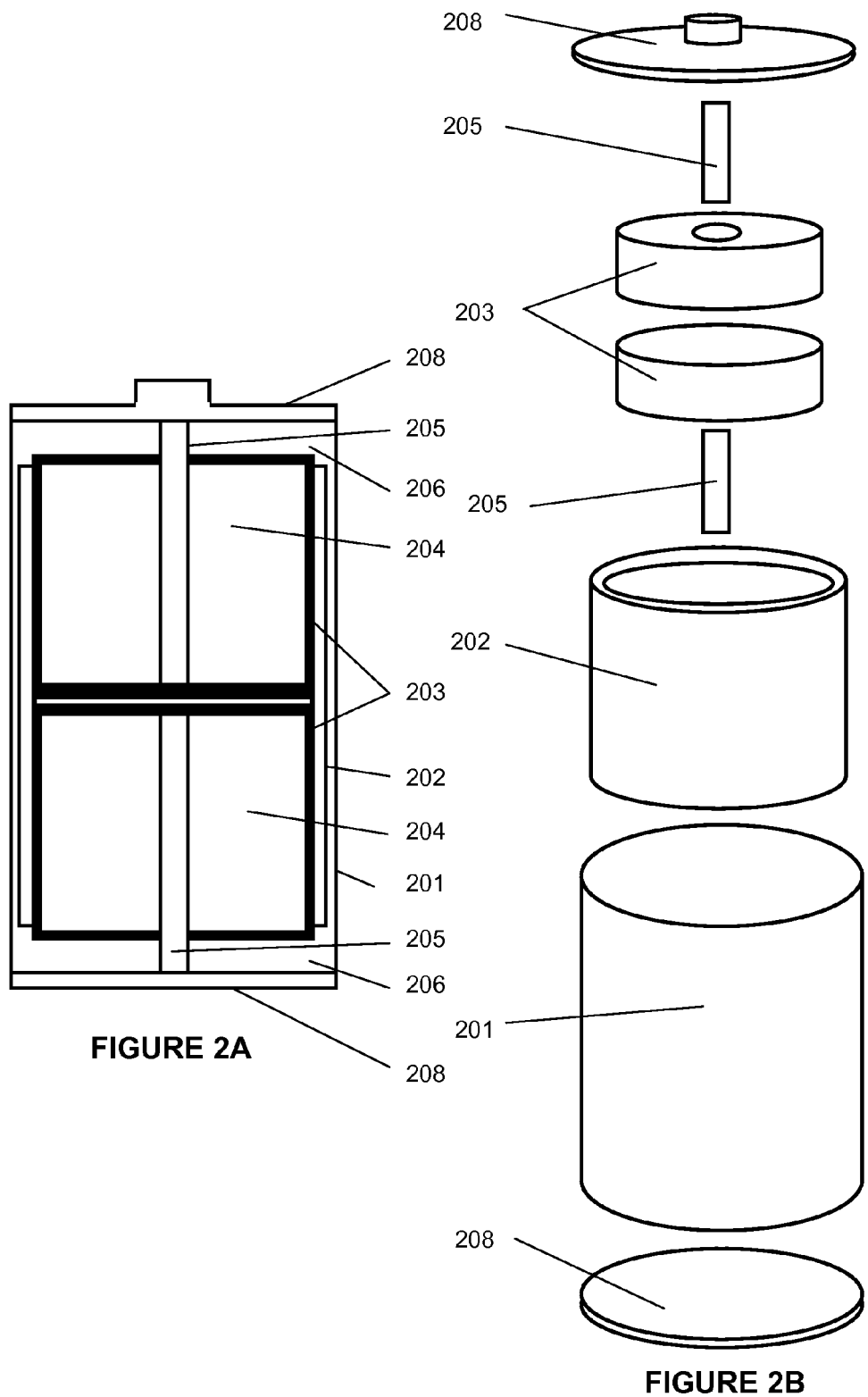
FIGS. 2A and 2B illustrate an exemplary aqueous EDL capacitor with electrical connections provided at opposite ends, in accordance with an embodiment of the present invention.

FIGS. 2A and 2B illustrate an exemplary aqueous EDL capacitor with electrical connections provided at opposite ends, in accordance with an embodiment of the present invention. FIG. 2A is a cross sectional view, and FIG. 2B is an exploded view. The present embodiment mimics the exterior shape of a common battery, such as, but not limited to, AAA, AA, C, D, etc., which it is designed to replace. In the present embodiment, the EDL capacitor comprises a container 201, a compression band 202, separators 203, electrodes 204, collectors 205, a sealant space 206, and end caps 208, the same elements as in the embodiment shown by way of example in FIGS. 1A and 1B, except for a container lid. A container lid is not needed to provide an enclosure for sealant space 206 in the present embodiment since end caps 208 are designed to provide this function. End caps 208 also provide electrical connections as in the previous embodiment. Electrolyte flooded electrodes 204 are positioned in an axial arrangement, as opposed to the lateral arrangement depicted, by way of example, in FIGS. 1A and 1B.

In a non-limiting example of an EDL capacitor made according to the present embodiment, a piece of plastic tubing 1.75 inches long with an inside diameter of $15/16$ of an inch and a $1/16$-inch wall thickness is used as container 201. This example mimics the size and shape of the common "C" cell. The material used for electrodes 204 is coconut based activated carbon with a BET surface area of 1150 $m^2/g$ and a specific capacitance of approximately 75 F/g mixed with 5% powdered graphite. Separators 203 are made from a single strip of paper 1.75 inches wide and 11 inches long. This strip of paper is rolled around a dowel $13/16$ of an inch in diameter to form a tube that fits loosely in container 201. A piece of cotton pad 1 inch in diameter and $1/8$ of an inch thick is positioned at the center of the paper tube to separate the electrode compartments. Graphite rods $1/4$-inch diameter and 1 inch long are inserted into the ends of the paper tube against the cotton pad to form collectors 205. The ends of the paper tube are then filled to within approximately $3/16$ of an inch of the ends using 4.0 grams of electrode material for each of the two compartments. Again, cardboard end pieces are fitted over collectors 205 into separators 203 to encapsulate the electrode material. The ends of the paper tube are then folded over the cardboard end pieces and glued into place. A rubber strand with a cross section of $1/16$ inch by $1/16$ inch is wound around the two formed electrodes 204 with an elongation of 250% to provide the necessary compression to create compression band 202. A long enough rubber strand is used to cover the outer circumference of electrodes 204 with one layer. The complete assembly is then inserted into plastic container 201. Asphalt is then carefully poured over the top of one end of the assembly to form sealant space 206 between container 201 and the collector 205 at that end. Then a saturated sodium chloride solution is poured over the assembly at the opposite end until it is completely saturated. Asphalt is then carefully poured over the top of this end of the assembly to form a sealant space 206 between container 201 and the collector 205 at this end. Metal end caps 208 are then affixed to the ends of collectors 205 and the ends of container 201.

When the completed EDL capacitor is charged to 1.3 volts, the following characteristics are observed after a four-hour charge: a capacitor voltage of 1.29 V, a capacitance of 300 Farads, a maximum current of 2.1 Amperes, and a leakage current of 100 µA @ 1.3 volts. This design is similar in size to the common "C" cell and has experimentally demonstrated a discharge of 80% of the stored energy in 10 minutes at maximum current. Repetitive charge/discharge cycles at 80% depth of discharge have also been demonstrated at maximum current for 250 cycles with no apparent loss of performance. This is consistent with the 100,000 cycles common for EDL capacitors. Under such conditions, a common rechargeable battery will typically fail in less than 100 cycles. The peak power of this example is similar to the lower end of commercially available rechargeable batteries.

Figures 3A, 3B:
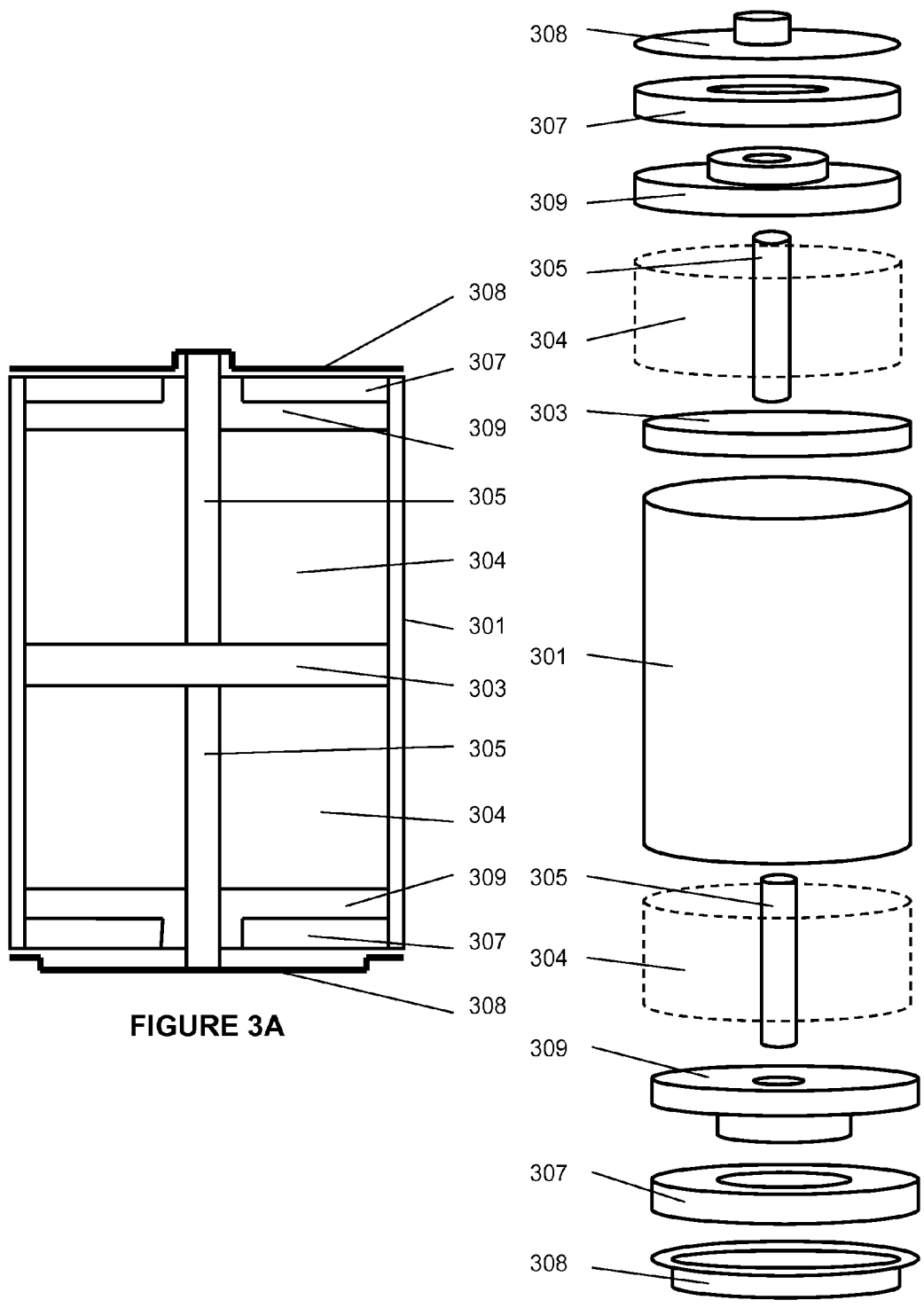
FIGS. 3A and 3B illustrate an exemplary aqueous EDL capacitor with electrical connections provided at opposite ends, in accordance with an embodiment of the present invention.

FIGS. 3A and 3B illustrate an exemplary aqueous EDL capacitor with electrical connections provided at opposite ends, in accordance with an embodiment of the present invention. FIG. 3A is a cross sectional view, and FIG. 3B is an exploded view. This embodiment represents a relatively general form of the present invention and mimics the exterior shape of a common battery. In the present embodiment, the circumferential compression band is replaced with two axial compression washers 309. Two container lids 307 are used as enclosures for the EDL capacitor and to provide support for compression washers 309. Compression washers 309 provide the dual function of forming an electrolyte seal between collectors 305 and container lids 307 and as a substitute for the compression band by providing axial compression for electrodes 304. The direction of the compression load is irrelevant, since electrodes 304 are composed of a deformable mass of electrolyte flooded granular material. Any compression loading, either axial or radial, is therefore evenly distributed throughout the volume of the material in flooded electrodes 304. Separator 303 together with a container 301 and compression washers 309 in this embodiment encapsulate the material in electrolyte flooded electrodes 304. End caps 308 provide external electrical connections.

In the present embodiment, container 301 forms the casing into which the components of the EDL capacitor are housed. It is preferably made of an electrically insulating and nonporous material that is impervious to the electrolyte and exhibits good structural strength to protect the contents from damage that might be caused by either impact or puncture such as, but not limited to, plastic. Container lids 307 are made of the same or similar material as container 301 and may be fastened to container 301 by various means including, but not limited to, a chemical or welded bond, adhesive or mechanical means. In this embodiment, container lids 307 provide structural support for compression washers 309 to form an electrolyte seal as well as an enclosure for ends caps 308 of the EDL capacitor.

In a non-limiting example, an EDL capacitor according to the present embodiment comprises a container 301 made from a piece of plastic tubing 1.75 inches long with an inside diameter of $15/16$ of an inch and a $1/16$-inch wall thickness. The material for electrode 304 is coconut based activated carbon with a BET surface area of 1150 $m^2/g$ and a specific capacitance of approximately 75 F/g mixed with 5% powdered graphite. A piece of cotton pad 1 inch in diameter and $1/8$-inch thick is positioned at the center of container 301 to create separator 303 to separate the compartments of electrode 304. Graphite rods $1/4$-inch diameter and 1 inch long are inserted into the ends of container 301 against the cotton pad of separator 303 to form collectors 305. The ends of container 301 are then filled to within approximately $7/32$ of an inch of the ends using 4.7 grams of electrode material for each of the two compartments of electrode 304. Care is taken to pack the electrode material firmly into each end of container 301 without puncturing the cotton pad of separator 303. Rubber compression washers 309 that are 15/16 of an inch in diameter and 1/8 of an inch thick with a center hole slightly smaller than 1/4-inch are glued to plastic lids 307. Lids 307 are made to fit snugly inside container 301 and are made 1/8-inch thick with a 3/8-inch hole in the center. First, one lid 307 is glued to the end of container 301 to form a liquid tight seal. Then the entire assembly is saturated with sodium chloride solution. Finally, the second lid 307 is glued to the end of container 301 to complete the EDL capacitor. A seal around collectors 305 are formed by the interference fit between rubber washers 309 and collectors 305. It is necessary to compress rubber washers 309 in order to glue plastic lids 307 flush with the ends of containers 301. When the completed EDL capacitor is charged to 1.3 volts, the following characteristics are observed after a four-hour charge: a capacitor voltage of 1.28 V, a capacitance of 350 Farads, a maximum current of 1.7 Amperes, and a leakage current of 100 µA @ 1.3 volts. This design is similar in size to the common "C" cell and has experimentally demonstrated a discharge of 80% of the stored energy in 10 minutes at maximum current. Repetitive charge/discharge cycles at 80% depth of discharge have also been demonstrated at maximum current for 250 cycles with no apparent loss of performance. This is consistent with the 100,000 cycles common for EDL capacitors. Under such conditions, a common rechargeable battery will typically fail in less than 100 cycles. The peak power of this example is similar to the lower end of commercially available rechargeable batteries.

Figures 4A, 4B:
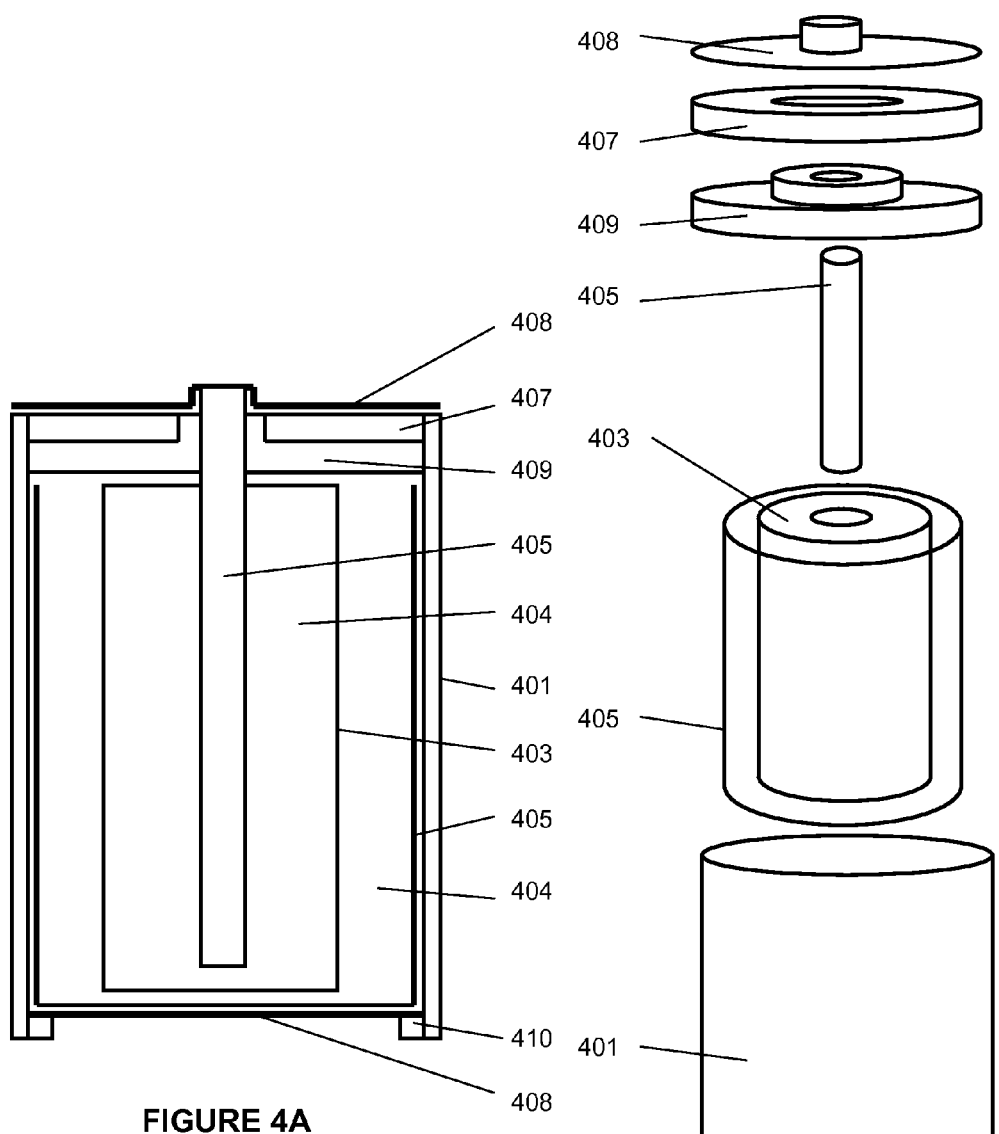
FIGS. 4A and 4B illustrate an exemplary aqueous EDL capacitor with electrical connections provided at opposite ends, in accordance with and embodiment of the present invention.

FIGS. 4A and 4B illustrate an exemplary aqueous EDL capacitor with electrical connections provided at opposite ends, in accordance with an embodiment of the present invention. FIG. 4A is a cross sectional view, and FIG. 4B is an exploded view. This embodiment represents the preferred form of the present invention and mimics the exterior shape of a common battery. In the present embodiment, the two electrodes 404 with their respective collectors 405 are formed in the shape of two concentric cylinders, which tends to maximize the surface area for ion migration between the two electrodes and increases the maximum current delivered. In this embodiment there is only one axial compression washer 409 and one container lid 407. As before, the container lid 407 is used as an enclosure for the EDL capacitor and to provide support for compression washer 409. Again, the compression washer 409 provides the dual function of forming an electrolyte seal between collector 405 and the container lid 407 and as a substitute for the compression band by providing axial compression for electrodes 404. However, in this embodiment, one of the collectors 405 is comprised of a flexible graphite material in the shape of a cylinder closed on one end and fits snugly against the inner wall of the container 401. The flexible graphite collector 405 serves the dual function of collecting the current and transferring it from the outer electrode 404 to the bottom end cap 408 and as a barrier to prevent contact between the electrolyte and the bottom end cap 408 that would otherwise cause corrosion. The bottom end cap 408 is held securely in place against a support ring 410 by the compression imposed by the compression washer 409. The support ring 410 is made of a plastic material that is of the same or similar material as the container 401 and can be either molded as part of the container or glued to the container 410 as a separate piece. Once again the direction of the compression load is irrelevant in terms of increasing the conductivity, since electrodes 404 are composed of a deformable mass of electrolyte flooded granular material. Any compression loading, either axial or radial, is therefore evenly distributed throughout the volume of the material in flooded electrodes 404. The separator 403 takes the shape of a cylinder that is closed on both ends with a small opening at the top where the inner collector 405 protrudes. Again the compression washer 409 provides an electrolyte seal between the inner collector 405 and container lid 407. The bottom end cap 408, together with a container 401 and compression washer 409 in this embodiment encapsulate the material in electrolyte flooded electrodes 404. End caps 408 provide external electrical connections.

In a non-limiting example, an EDL capacitor according to the present embodiment comprises a container 401 made from a piece of plastic tubing 1.75 inches long with an inside diameter of 15/16 of an inch and a 1/16-inch wall thickness. The material for electrode 404 is coconut based activated carbon with a BET surface area of 1150 $m^2/g$ and a specific capacitance of approximately 75 F/g mixed with 5% powdered graphite. The separator 403 is fashioned from a strip of 24 lb printer paper 1.813 inches wide and 11 inches long. The paper strip is rolled onto a form with a 3/4 inch circular cross section to form a tube. One end of the separator 403 is then closed off by inserting a cardboard end piece and folding over 3/16 inch of the paper tube and affixing with adhesive. The inner collector 405, which consists of a graphite rod 8 mm diameter and 1.75 inches long, is then inserted into the open-ended tube of separator 403, which is then filled with 5 grams of the activated carbon material. Another cardboard end piece is then affixed to the open ends of separator 403 in the same manner previously described, leaving inner collector 405 protruding from the assembly of electrode 404. Care is taken to pack the electrode material firmly into one end of separator 401 without puncturing the paper wall. A support ring 410 is fashioned from a piece of plastic tubing that is 13/16 inch inside diameter and 15/16 inch outside diameter by cutting off a piece that is 1/16 inch long. The support ring 410 is then glued to one end of the container 401. The bottom end cap 408 is made from a piece of sheet metal that is 15/16 inch in diameter and is positioned on the inner side of the support ring 410. An outer collector is made from a sheet of 0.015 inch thick flexible carbon material to fit snugly against the inside of the container 401 and the bottom end cap 408. The assembly of electrode 404 is placed centered inside the container assembly and the space between is filled and packed with 5 grams of electrode material and then saturated with sodium chloride solution. A rubber compression washer 409 that is 15/16 of an inch in diameter and 1/8 of an inch thick with a center hole that is 5/16-inch is glued to plastic lid 407. The lid 407 is made to fit snugly inside container 401 and is made 1/8-inch thick with a 3/8-inch hole in the center. The lid 407 is then glued to the end of container 401 to form a liquid tight seal. A seal around the inner collector 405 is formed by the interference fit between the rubber washer 409 and inner collector 405. It is necessary to compress rubber washer 409 in order to glue plastic lids 407 flush with the end of containers 401. When the completed EDL capacitor is charged to 1.3 volts, the following characteristics are observed after a four-hour charge: a capacitor voltage of 1.3 V, a capacitance of 375 Farads, a maximum current of 2.7 Amperes, and a leakage current of 10 µA @ 1.3 volts. This design is similar in size to the common "C" cell and has experimentally demonstrated a discharge of 80% of the stored energy in 5 minutes at maximum current. Repetitive charge/discharge cycles at 80% depth of discharge have also been demonstrated at maximum current for 250 cycles with no significant loss of performance. This is consistent with the 100,000 cycles common for EDL capacitors. Under such conditions, a common rechargeable battery will typically fail in less than 100 cycles. The peak power of this example is similar to commercially available rechargeable batteries.

In preferred embodiments the electrodes are composed of a high surface area material with a granular texture, preferably activated carbon. However, other high surface area materials such as, but not limited to, Carbon Black may also be used. In some preferred embodiments, an agent can be added to the electrode material to improve conductivity; however, other preferred embodiments may be implemented without a conductivity enhancing agent. Examples of agents include, but are not limited to, graphite, carbon black, and acetylene black and may be powdered, fibered, or in flake form. A granulated activated carbon is used to make the electrodes in preferred embodiments in preference to carbon fiber material for the purpose of high energy density and low cost. Carbon fibered materials, such as, but not limited to, carbon cloth, have a density of about 0.35, as compared to about 0.7 for particulate carbon. This translates to twice the energy density by volume and a corresponding increase in energy density by weight, since all other components are smaller for a given amount of carbon contained within the capacitor. Granular electrodes have also demonstrated a lower self-discharge rate than powdered electrodes, especially at the peak voltage rating. Activated carbons with a surface area of 500 to 3,000 square meters per gram as measured by the BET method are preferably used. Such activated carbon material can be made from coal, coconut, or any other carbon containing material that results in a large surface area upon carbonization and activation. However, it has been found that the capacitance of such activated carbons is not directly proportional to the surface area. The method of activation should be performed in a manner that results in a pore size distribution that is optimum for the aqueous electrolytes used. Pores greater than 1 nanometer are necessary for electrolyte accessibility and high specific capacitance. However, if the pore sizes are too large, the carbon material is not effectively utilized and results in a low specific capacitance. Various types of activated carbons have resulted in specific capacitances ranging from 50 Farads per gram to as much as 500 Farads per gram. The optimum particle size has been found to comprise a distribution that peaks between 0.01 mm and 0.1 mm. The resulting granular electrode material enables the electrodes to have a thick cross section, preferably greater than ⅛ of an inch, and low internal resistance, which allows maximum carbon volumetric filling and facilitates simple and low cost construction. The low internal resistance is the result of low inter-particle contact resistance due to the relatively large particle size, as compared with powdered activated carbon electrodes. The large particle size also provides a low restrictive path for ion migration of the electrolyte, which further helps to minimize the internal resistance.

The separators in preferred embodiments serve to encapsulate and therefore confine the electrode material. This feature enables the use of granular electrodes without the need for binders. Binders, which are commonly used in the prior art, tend to increase internal resistance and clog the pores of the activated carbon. Clogging the pores causes a reduction of the available surface area for the double layer to form, which reduces the specific capacitance. Confinement of the granular electrode material in some preferred embodiments, shown by way of example in FIGS. 1A, 1B, 2A, and 2B, is aided with the use of a compression band, which prevents the deformation of the porous separators. In other preferred embodiments, the confinement of the granular electrode material is aided with the use of compression washers, shown by way of example in FIGS. 3A, 3B, 4A, and 4B. Compression applied to the electrode material further reduces the internal resistance, increases capacitance, and results in a low rate of self-discharge. In preferred embodiments, the compression of the electrodes is preferably 100 psi, which reduces internal resistance by a factor of ½ and increases capacitance by 25% or more, depending on the carbon that is used. This amount of compression also reduces capacitor self-discharge by a factor of at least 10. Further compression gives diminishing returns, especially since the weight of the device increases with the material that is used to maintain the higher pressure. Also, at very high pressures, too much electrolyte is excluded from the electrodes, causing a reversal to increase the internal resistance and decrease the energy density by excluding too much of the electrolyte that is necessary to form the double layer.

In preferred embodiments, the electrodes are flooded with an aqueous electrolyte with a high ionic concentration and a pH at or near 7. Suitable aqueous electrolytes include, but are not limited to, saturated solutions of sodium chloride, calcium chloride, and magnesium chloride. Saturated solutions of highly soluble salts provide the high ion concentrations necessary for a high energy density. The energy density of an EDL capacitor is limited by both the effective surface area of the electrode material and the concentration of ions utilized in forming the double layer. An electrolyte with a pH at or near 7 has been found to provide the lowest rate of self-discharge. Discharge rates of less than 100 μA at a full charge of 1.3 volts have been observed with capacitors according to preferred embodiments of the present invention having a capacitance of 375 Farads. The use of an electrolyte with a pH near 7 also has the advantage of providing a high breakdown voltage for aqueous electrolytes, especially with chloride salts. This provides the highest possible capacitance, since the energy stored in a capacitor is proportional to the square of the applied voltage and also since the capacitance of an EDL capacitor has the unique feature of increasing with applied voltage. Aqueous electrolytes are 10 to 30 times more conductive than organic electrolytes, which aids in the use of thick electrodes in preferred embodiments and greatly reduces the need for a large collector surface area. The relatively low molecular weight of the aqueous electrolytes employed in preferred embodiments provides a high energy density by minimizing the mass of electrolyte necessary to provide the high ion concentration for the electric double layer.

The collectors in preferred embodiments form the electrical connection between the electrodes and the end caps. The collectors are preferably comprised of a non-porous solid or composite electrically conducting material that possesses the property of inertness in the aqueous electrolyte used. Graphite with a wax content of about 10% works well, since there is no possibility for oxidation or electrochemical action to take place from the intimate contact with the electrode material. The lack of oxidation present from using graphite also generally ensures a good electrical connection for conducting charge stored within the electrode material to the collectors and ultimately to the end caps where external electrical connection is made. In preferred embodiments, the collectors are made with a large enough cross section and surface area to efficiently transfer charge from the electrode material to the end caps, yet not so large as to unnecessarily reduce the volume occupied by the electrode material. Collectors that are cylindrical in shape work well and are convenient; however, other shapes can be used to enhance performance such as, but not limited to, current output or efficiency.

In preferred embodiments, the end caps provide external electrical connections for the capacitor and are made of highly conductive material such as, but not limited to, metal. The end caps preferably are made from any non-readily oxidizeable metal to form the exterior electrical connections for the EDL capacitor by direct physical contact with the collectors. Examples of metals used include, but are not limited to, stainless steel, nickel coated steel, galvanized steel, as well as many types of alloys. Since the end caps are outside the electrode cavity in preferred embodiments, the end caps do not come into contact with the electrolyte contained within this cavity created by the container and either the sealant space, as shown by way of example in FIGS. 1A and 2A, or the compression washers, as shown by way of example in FIGS. 3A and 4A. This isolation generally prevents the possibility for any electrochemical oxidation to occur that would otherwise degrade the end caps.

In preferred embodiments comprising a sealant space, shown by way of example in FIGS. 1A, 1B, 2A, and 2B, the sealant space forms a seal with the container and the collectors that generally prevents the loss of electrolyte and protects the metal end caps from electrochemical oxidation that would occur from contact with the electrolyte. The sealant material fills the space between the electrodes and either the container lid, shown by way of example in FIG. 1A, or the metal end caps, shown by way of example in FIG. 2A. Suitable materials for the sealant space are electrically insulating, impervious to the electrolyte used, and form a strong adhesive bond with the container. Examples of suitable sealant materials include, but are not limited to, asphalt, wax, and rubber.

In preferred embodiments, the separators encapsulate and isolate the electrode material while providing an unobstructed path for ion migration that is necessary for the charge and discharge cycles of the electric double layer. Separators are preferably comprised of a highly porous material that functions as both an electrical insulator and an ion conductor. The material that is used to make the separators in preferred embodiments is thick enough to generally prevent contact between the electrode material of the anode and cathode from puncture. Also, the density of the porous material used in preferred embodiments should be such that the carbon particles of the electrode material cannot migrate from one electrode to the other. Many separator materials have been found to be useful, including, but not limited to, paper, glass fiber matt, porous polyvinyl chloride, cellulose acetate, and ion exchange membranes.

In preferred embodiments using a compression band, shown by way of example in FIGS. 1A, 1B, 2A, and 2B, the compression band provides and maintains radial compression for the electrodes necessary for optimum performance. Compression bands are preferably made of a material that is inert and elastic, such as, but not limited to, natural or synthetic rubber. The use of an elastic material is important for maintaining the designed compression. The force that the compression band in preferred embodiments exerts on the electrode material does not change appreciably for any shifting that might occur during production or with continued use of the EDL capacitor. The compression band in preferred embodiments may comprise a single band of material or a thin strand that is wound around the electrodes many times to cover their outer circumference. Similarly, in preferred embodiment using compression washers, illustrated by way of example in FIGS. 3A, 3B, 4A, and 4B, the compression washers provide and maintain axial compression for optimum capacitor performance. In preferred embodiments, compression washers are also preferably made of a material that is inert and elastic, such as, but not limited to, natural or synthetic rubber. The compression washers in preferred embodiments also provide a second function of forming an electrolyte tight seal between the collectors and the container lids. The compression washers are preferably molded as a single piece to generally prevent the possibility of electrolyte leakage.

In typical use of preferred embodiments of the present invention, the EDL capacitors are intended to replace the function of common batteries for every use that batteries perform. As such, preferred embodiments are designed as high energy density electrical storage devices with moderate power density. Future material developments may broaden the applications of preferred embodiments to include those that require high power density as well. Applications for preferred embodiments of the present invention include, but are not limited to, use in portable electronic devices, memory backup, electric operated toys, energy storage for alternative energy systems, portable power supplies, electric vehicles, etc.

It is anticipated that there are numerous variations and modifications possible for constructing embodiments of the present invention that will be apparent to those skilled in the art. Such variations include, but are not limited to, variations in the sizes and shapes of the capacitor components and substitution for materials. For example, without limitation, the collectors are shown to be round rods and flexible carbon sheets in the foregoing embodiments; however, collectors in alternate embodiments may be any shape such as, but not limited to, triangular, square, hexagonal, star-shaped, etc. In some embodiments a rod with many flutes may be used as the collector, effectively increasing the surface area of contact for better conduction. The containers illustrated by way of example in the foregoing embodiments are cylindrical; however, containers of various different shapes may be used in alternate embodiments. The cylindrical shape is the strongest and most efficient use of material for concerns of energy density by weight. However, a container in the shape of a square tube may provide a more efficient use of space. Other tubular shapes are also possible, such as, but not limited to triangles, hexagons, etc., and may be suitable for applications that require a specific geometry. With geometries that incorporate flat sides, flat rigid inserts may be used between the elastic compression band and the electrode material to evenly distribute the force of compression. The previously described embodiments illustrate the use of one pair of electrodes, an anode and a cathode. However, if very large capacitances are desired for one capacitor, several pairs of electrodes can be placed within a single container in alternate embodiments. One advantage of this is to avoid the need for electrical connections that would otherwise be required to produce the same equivalent capacitance by connecting many capacitors in parallel. Another advantage is to generally prevent an increase in internal resistance that results from using very large electrode pairs. In many practical applications, if there is no isolation of electrolyte between electrode pairs, then generally they cannot be connected in series because it is expected that this would create a path for electrolyte breakdown to occur. If the electrode pairs are electrically isolated, then they may be connected in series for higher working voltages, provided that the capacitance of each pair is the same within approximately 5%.

Having fully described at least one embodiment of the present invention, other equivalent or alternative methods of providing EDL capacitors according to the present invention will be apparent to those skilled in the art. The invention has been described above by way of illustration, and the specific embodiments disclosed are not intended to limit the invention to the particular forms disclosed. For example, the particular implementation of the capacitor may vary depending upon the particular type of intended use. The capacitors described in the foregoing were directed to implementations implemented to replace existing batteries; however, similar techniques are to develop capacitors for specific applications. Implementations of the present invention not meant to replace existing batteries are contemplated as within the scope of the present invention. The invention is thus to cover all modifications, equivalents, and alternatives falling within the spirit and scope of the following claims.

Claim elements and steps herein have been numbered and/or lettered solely as an aid in readability and understanding. As such, the numbering and lettering in itself is not intended to and should not be taken to indicate the ordering of elements and/or steps in the claims.

What is claimed is:

1. An electric double layer capacitor comprising:
    a container comprising electric insulating material for housing the capacitor;
    at least two electrodes comprising granular particulate for storing a charge;
    an aqueous electrolyte having a generally neutral pH for flooding said at least two electrodes;
    a separator material comprising a porous electrical insulating and ionic conducting material for separating said at least two electrodes;
    at least two collectors comprising graphite each in contact with an electrode for conducting current;
    an elastic compression material compressing said at least two electrodes flooded by said aqueous electrolyte for maintaining a firm contact of said at least two collectors with material in flooded electrodes;
    and end caps comprising a high conductivity material joined to said at least two collectors for making external electrical connections;
    wherein said at least two electrodes form a cylinder shape;
    said elastic compression material is formed as a band surrounding said cylinder shape, and each of said at least two electrodes has a semicircular shape and said at least two electrodes are positioned to form said cylinder shape.

2. The electric double layer capacitor as recited in claim 1, wherein said granular particulate comprises activated carbon material.

3. The electric double layer capacitor as recited in claim 2, wherein particles of said activated carbon material are of sufficient size to enable low inter-particle resistance and low restrictive path for ion migration.

4. The electric double layer capacitor as recited in claim 3, wherein said activated carbon material is produced from coconut.

5. The electric double layer capacitor as recited in claim 1, wherein said aqueous electrolyte is a saturated solution of a soluble salt.

6. The electric double layer capacitor as recited in claim 5, wherein said soluble salt comprises a chloride salt.

7. The electric double layer capacitor as recited in claim 1, wherein said end caps are located on a top end of said container.

8. An electric double layer capacitor comprising:
    a container comprising electric insulating material for housing the capacitor;
    at least two electrodes comprising granular particulate for storing a charge;
    an aqueous electrolyte having a generally neutral pH for flooding said at least two electrodes;
    a separator material comprising a porous electrical insulating and ionic conducting material for separating said at least two electrodes;
    at least two collectors comprising graphite each in contact with an electrode for conducting current;
    an elastic compression material compressing said at least two electrodes flooded by said aqueous electrolyte for maintaining a firm contact of said at least two collectors with material in flooded electrodes;
    end caps comprising a high conductivity material joined to said at least two collectors for making external electrical connections; wherein
    said at least two electrodes form a cylinder shape;
    said elastic compression material is formed as a band surrounding said cylinder shape, wherein said at least two electrodes are positioned along a common axis, one of said end caps is located on a top end of said container and another of said end caps is located on a bottom end of said container.

9. The electric double layer capacitor as recited in claim 8, wherein said compression material is formed as a compression washer adjacent to said end cap on said top and an additional compression washer adjacent to said end cap on said bottom.

10. An electric double layer capacitor comprising:
    a container comprising electric insulating material for housing the capacitor;
    at least two electrodes comprising granular particulate for storing a charge;
    an aqueous electrolyte having a generally neutral pH for flooding said at least two electrodes;
    a separator material comprising a porous electrical insulating and ionic conducting material for separating said at least two electrodes;
    at least two collectors comprising graphite each in contact with an electrode for conducting current;
    an elastic compression material compressing said at least two electrodes flooded by said aqueous electrolyte for maintaining a firm contact of said at least two collectors with material in flooded electrodes;
    end caps comprising a high conductivity material joined to said at least two collectors for making external electrical connections; wherein
    said at least two electrodes form a cylinder shape; wherein said elastic compression material is formed as a compression washer adjacent to said end cap on said top.

11. The electric double layer capacitor as recited in claim 10, wherein said at least two electrodes are concentrically arranged and said at least two collectors are concentrically arranged.

* * * * *